(12) United States Patent
Weissinger et al.

(10) Patent No.: US 9,163,834 B2
(45) Date of Patent: Oct. 20, 2015

(54) FORCED FLOW STEAM GENERATOR HAVING WALL HEATING SURFACE AND METHOD FOR ITS OPERATION

(75) Inventors: Gerhard Weissinger, Koengen (DE); Thoralf Berndt, Stuttgart (DE); Ralph Dobrowolski, Stuttgart (DE); Andreas Marquard, Stuttgart (DE)

(73) Assignee: ALSTOM Technology Ltd, Baden (CH)

( * ) Notice: Subject to any disclaimer, the term of this patent is extended or adjusted under 35 U.S.C. 154(b) by 134 days.

(21) Appl. No.: 13/993,750

(22) PCT Filed: Dec. 2, 2011

(86) PCT No.: PCT/IB2011/002942
§ 371 (c)(1),
(2), (4) Date: Jul. 22, 2013

(87) PCT Pub. No.: WO2012/080798
PCT Pub. Date: Jun. 21, 2012

(65) Prior Publication Data
US 2014/0083374 A1   Mar. 27, 2014

(30) Foreign Application Priority Data
Dec. 13, 2010 (DE) .......................... 10 2010 061 186

(51) Int. Cl.
*F22B 29/06* (2006.01)
*F23L 7/00* (2006.01)
(Continued)

(52) U.S. Cl.
CPC . *F23L 7/007* (2013.01); *F02C 6/18* (2013.01); *F02C 7/18* (2013.01); *F22B 29/06* (2013.01);
(Continued)

(58) Field of Classification Search
CPC ...... F22B 29/08; F22B 1/1815; F22B 21/346; F22B 29/02; F22B 29/06; F22B 29/062; F22B 29/12; F22B 35/10; F22D 11/00
USPC .................... 122/1 B, 406.4, 451 S
See application file for complete search history.

(56) References Cited

U.S. PATENT DOCUMENTS

| 2,725,042 A | 11/1955 | Schroeder | |
|---|---|---|---|
| 2,980,082 A * | 4/1961 | Firl | ............... 122/459 |

(Continued)

FOREIGN PATENT DOCUMENTS

| CN | 200975664 Y | 11/2007 |
|---|---|---|
| CN | 101642793 A | 2/2010 |

(Continued)

OTHER PUBLICATIONS

Decision of Grant issued from Russian Patent Office dated May 19, 2015 for RU Application No. 2013132212.

*Primary Examiner* — Gregory A Wilson

(57) ABSTRACT

The invention refers to a forced flow steam generator (10) and to a method for its operation. The forced flow steam generator (10) has a combustion chamber (11) with a burner arrangement (20). A fuel (B) and a mixture (G) consisting of pure oxygen and flue gas (R) are fed into the combustion chamber (11) or to the burner arrangement (20) for combusting. A flue gas duct (27) is connected to the combustion chamber (11) in the flow direction (S) of the flue gas (R), and a flue gas passage (26) is connected to the flue gas duct. The flue gas (R) for the oxygen-flue gas mixture (G) is fed back from the flue gas passage (26) via a flue gas recirculation line (28). The forced flow steam generator (10) is operated in the so-called oxyfuel process. A plurality of auxiliary heating surfaces (35) are arranged in the flue gas duct (27) downstream of the burner arrangement (20). Between the burner arrangement (20) and the auxiliary heating surfaces (35), provision is made for a wall heating surface arrangement (36) which at least partially covers a combustion chamber wall section (38) of the combustion chamber wall (12) which delimits the combustion chamber (11). For this purpose, the wall heating surface arrangement (36) has a plurality of wall heating surfaces (37) which butt against the respectively associated segment of the combustion chamber wall section (38). The operating medium (A) flows through the wall heating surface arrangement (36) and in this way thermal energy is dissipated from the flue gas (R) in order to limit the heating of the operating medium (A) in the combustion chamber wall tubes (13) and therefore to limit wall tube temperatures in the upper section of the boiler.

13 Claims, 3 Drawing Sheets

Figure 1:
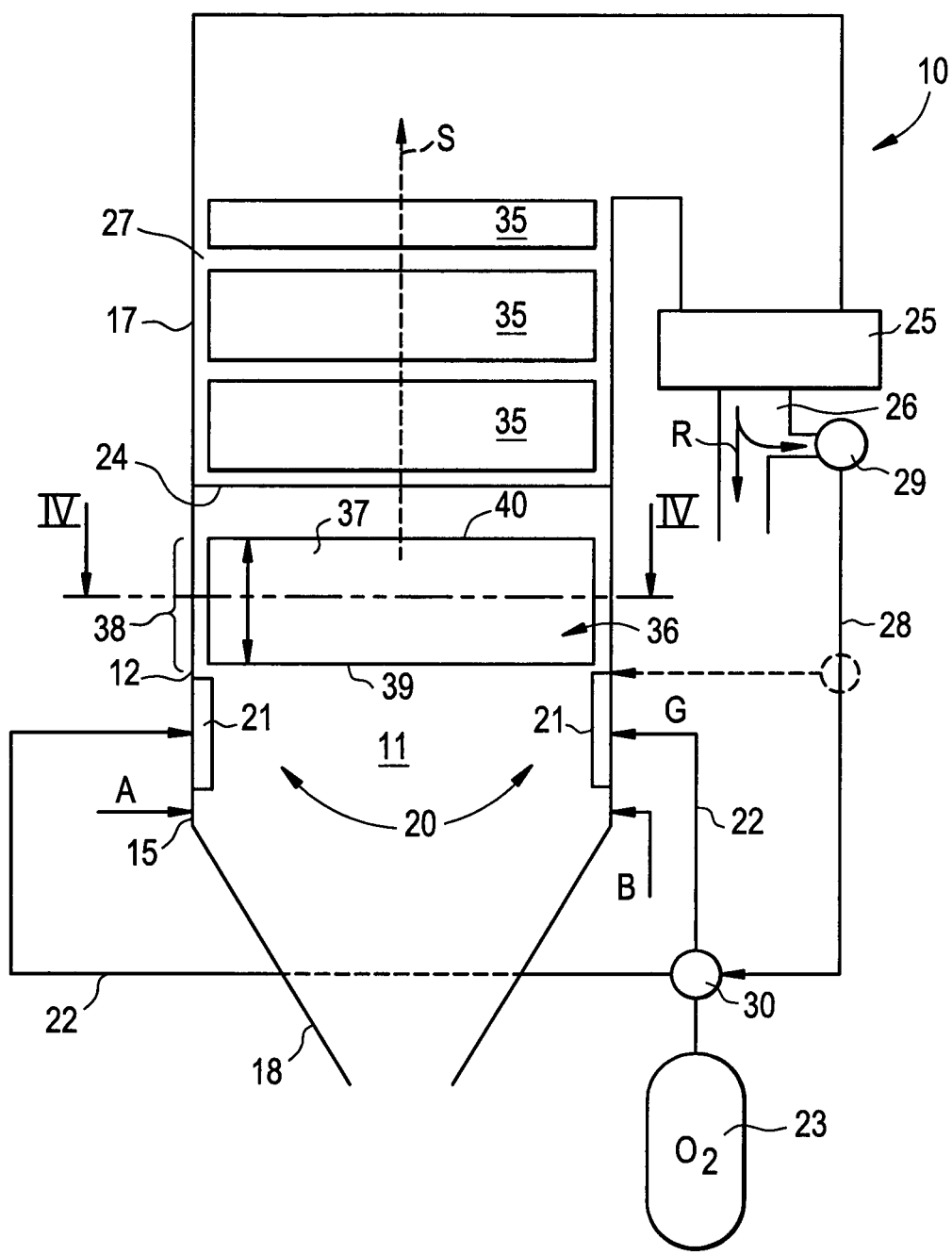

(51) Int. Cl.
   *F02C 6/18* (2006.01)
   *F02C 7/18* (2006.01)
   *F22B 37/10* (2006.01)
   *F23C 9/06* (2006.01)

(52) U.S. Cl.
   CPC ............... *F22B 29/062* (2013.01); *F22B 37/10* (2013.01); *F22B 37/108* (2013.01); *F23C 9/06* (2013.01); *Y02E 20/322* (2013.01)

(56) References Cited

U.S. PATENT DOCUMENTS

| | | | |
|---|---|---|---|
| 3,135,243 | A | 6/1964 | Schroedter |
| 4,278,052 | A | 7/1981 | Sharp |
| 2001/0000863 | A1 | 5/2001 | Marin et al. |
| 2001/0008066 | A1* | 7/2001 | Liebig ..................... 60/39.02 |
| 2003/0024417 | A1* | 2/2003 | Vomberg ................. 100/214 |
| 2008/0006188 | A1 | 1/2008 | Wu et al. |
| 2008/0149047 | A1* | 6/2008 | Becker et al. .................. 122/4 R |
| 2010/0031506 | A1* | 2/2010 | Hartwig et al. .......... 29/890.046 |

FOREIGN PATENT DOCUMENTS

| | | |
|---|---|---|
| DE | 3207987 A1 | 9/1983 |
| DE | 10356703 A1 | 7/2005 |
| DE | 60201741 T2 | 3/2006 |
| EP | 0198758 A | 10/1986 |
| EP | 0352488 A1 | 1/1990 |
| RU | 2091664 C1 | 9/1997 |
| RU | 2109209 C1 | 4/1998 |
| SU | 99976 A1 | 1/1995 |
| TW | 216184 | 11/1993 |
| TW | 393553 | 6/2000 |
| TW | 200936958 | 9/2009 |
| TW | 201030286 | 8/2010 |
| TW | 201040463 | 11/2010 |
| TW | 201040464 | 11/2010 |
| WO | 00/42354 | 7/2000 |

* cited by examiner

FORCED FLOW STEAM GENERATOR HAVING WALL HEATING SURFACE AND METHOD FOR ITS OPERATION

The invention refers to a forced flow steam generator which is provided and designed for operation in the so-called oxyfuel process, and also to a method for operating the forced flow steam generator. In the oxyfuel process, instead of air, basically a mixture consisting of recirculated flue gas and oxygen is fed as oxidant into a combustion chamber or to a burner arrangement of the steam generator. Coal, and preferably dry brown coal, can serve as fuel. During combustion of the fuel, very high temperatures are produced in the combustion chamber with the aid of the flue gas-oxygen mixture as oxidant. The operating medium, which flows through the combustion chamber wall tubes and the adjoining tubes of the surrounding wall of a flue gas duct, is very intensely heated. The combustion chamber wall or the surrounding wall must be able to withstand these temperatures.

The forced flow steam generator, downstream of the burner arrangement in a flue gas duct which is connected to the combustion chamber, has at least one auxiliary heating surface, wherein the at least one auxiliary heating surface can be constructed as a superheating surface, as a reheat surface or as a so-called economizer. In particular, a plurality of such auxiliary heating surfaces are provided so that a combination of superheating surfaces, reheat surfaces and economizers can be provided.

The flue gas temperature at the combustion chamber exit or upon reaching the auxiliary heating surfaces is to lie within a desired predetermined range which, for example, can lie between 950 and 1100 degrees Celsius, the accurate value depending upon the fuel which is used. During the oxyfuel operation, the combustion chamber wall, in the region between the burner arrangement and the at least one auxiliary heating surface, has to withstand high temperatures. Both the combustion chamber wall and the surrounding wall of a flue gas duct adjoining it have to correspondingly dissipate a large amount of heat via the operating medium. In order to take these requirements into consideration, a martensitic steel alloy and/or a nickel-based material could be used as the material for these walls. These materials, however, have the disadvantage that they require a postheat treatment during construction and during any repair work at the operating site if individual wall sections are interconnected by means of welding. The cost for the construction and the maintenance of such walls is therefore very high. It is therefore desirable to avoid martensitic steel alloys and nickel-based materials as materials for the combustion chamber wall or surrounding wall.

A further possibility for cooling the walls could be to increase the recirculation proportion of the cooler flue gas, which serves for forming the flue gas-oxygen mixture, in order to consequently reduce the temperature in the combustion chamber and to reduce the heat absorption of the operating medium in the combustion chamber wall tubes. This, in turn, would have the result that a larger amount of oxygen would have to be used for maintaining a predetermined oxygen proportion of, for example, 21 vol % or up to 30 vol % of the oxygen-flue gas mixture. The production of oxygen is expensive and energy-intensive. On account of this, the consumption of oxygen of the steam generator is to be minimized as far as possible, which in equal measure limits the proportion of flue gas for recirculation. Even if increasing the flue gas proportion is possible without additional feed of oxygen, then this does not constitute an optimum solution. Therefore, the recirculated flue gas must be cleaned so that for cost reasons, with regard to capital expenditure and operation of the plant, the recirculation proportion of the flue gas is to be minimized as far as possible. The greater the recirculated flue gas proportion is, the lower the efficiency of the plant is from the point of view of operational economy.

Forced flow steam generators, which are also referred to as once-through steam generators, are known per se, for example from the publication "Kraftwerkstechnik zur Nutzung fossiler, regenerativer and nuklearer Energiequellen" ("Power plant technology for using fossil, regenerative and nuclear energy sources"), Prof-Eng. Karl Strauss, Springerverlag, $2^{nd}$ Edition 1994, Chapter 4.4.2.4, Pages 171-174. In contrast to recirculating steam generators or forced circulation steam generators, the operating medium, in the form of water, steam or a water-steam mixture, is already completely evaporated in the evaporator in a once-through steam generator or forced flow steam generator in once-through operation during a once-through pass. On the other hand, in recirculating steam generators the operating medium is not completely evaporated after a pass through the evaporator and the unevaporated proportion, after separation from the steam, is fed again to the evaporator.

Based on this, it can be considered to be an object of the present invention to create a forced flow steam generator, the cost of which in the case of production, maintenance and operation is comparatively low and which is suitable for operation in the oxyfuel process with a flue gas-oxygen mixture as oxidant instead of air.

This object is achieved by means of a forced flow steam generator with the features of patent claim 1, and also by means of an operating method of the forced flow steam generator with the features of patent claim 14.

The forced flow steam generator has a combustion chamber wall, which delimits the combustion chamber, and a surrounding wall, which delimits a flue gas duct. The flue gas duct is connected to the combustion chamber in the flow direction. Both walls have in each case a plurality of interconnected wall tubes which can preferably be arranged for the most part in a manner extending obliquely to the horizontal and vertical. The combustion chamber wall tubes are preferably interconnected via ribs to form a gastight combustion chamber wall. The surrounding wall tubes are correspondingly interconnected to form a gastight surrounding wall. The respective tubes or walls are produced from a steel alloy with a chromium proportion of 1.9-2.6 wt % (weight percent). As a result, after the welding together of individual wall segments at the operating site of the steam generator, a costly aftertreatment, as would be the case with martensitic steel alloys or nickel-based materials, is dispensed with. The steel alloy which is used for the wall tubes or the walls is ferritic. In a preferred embodiment, the chromium proportion of the steel alloy lies within the range of 2.25-2.5 wt %. The materials T23 or T24, for example, which are defined and standardized in specification A 213/A 213 M-09a of the ASTM International, West Conshohocken, USA, for example, can be used as the alloy. Further definitions for the material T23 are found in VdTÜV (Association of Technical Inspection Agencies) materials specification sheet 511/2, issue 06.2001, for example, and for the material T24 are found in standard specification sheet DIN EN 10216-2, October 2007 issue, for example.

The steel alloy used for the wall tubes or walls would not withstand the high temperatures when the fuel—especially dry brown coal—is being combusted with the mixture consisting of flue gas and pure oxygen as oxidant. In particular, the heat absorption of the operating medium and the consequently ensuing temperature of the medium in conjunction with the operating pressure would be excessively high. In order to design the forced flow steam generator for operation in the oxygen fuel process, a wall heating surface arrangement is therefore arranged in the combustion chamber, according to the invention. This wall heating surface arrangement serves for limiting the heat absorption of the operating medium which flows through the wall tubes. The wall heating surface arrangement extracts thermal energy from the flue gas for this purpose and at least partially shields a combustion chamber wall section so that the operating medium which flows in the combustion chamber wall tubes along this combustion chamber wall section is not heated, or heated only to a predetermined degree. Only over the part of the wall tubes which is not covered by the wall heating surface arrangement is the operating medium, which flows therein, noticeably heated. In particular, the size and disposition of the wall heating surface arrangement in the combustion chamber wall section is determined so that the operating medium in the combustion chamber wall tubes and in the surrounding wall tubes does not exceed a predetermined critical temperature of 500° C., for example.

The wall heating surface arrangement is arranged between the burner arrangement and the at least one auxiliary heating surface in the flow direction of the flue gas. The wall heating surface arrangement preferably has a plurality of separate wall heating surfaces which are arranged next to each other in the circumferential direction inside the combustion chamber wall section. It is possible in this case that the wall heating surfaces are attached next to each other at one level, as seen in the flow direction. Alternatively, the wall heating surfaces can also be arranged inside the combustion chamber wall section in an offset manner in relation to each other in the flow direction of the flue gas. The wall heating surfaces preferably form a basically closed ring and in the main completely cover the combustion chamber wall section.

The wall heating surface arrangement particularly has a plurality of heating surface tubes which butt against each other or extend next to each other at a distance of 2 cm maximum, and preferably less than 5 mm, forming small interspaces. The individual wall heating surfaces of the wall heating surface arrangement directly butt against each other or form a small interspace of 30 em maximum or 10 cm maximum. Therefore, the wall heating surface arrangement can be tightly constructed or can have smaller interspaces or gaps of 30 cm maximum or 10 cm maximum for taking into account the expansion behavior of the material of the wall heating surfaces during thermal loading. In this way, the wall heating surface arrangement in the main completely covers the combustion chamber wall section in the circumferential direction. The fact that the described smaller interspaces can remain is to be understood by the term "in the main". It has been shown that such interspaces very quickly clog with ash particles during operation of the forced flow steam generator so that a complete covering of the forced flow steam generator is already achieved a short time after it being put into operation.

The wall heating surface arrangement at least partially also shields the combustion chamber wall section lying behind it against heat radiation of the burner flames.

Due to the fact that the wall heating surface arrangement prevents an impermissibly intense heating of the operating medium in the wall tubes, the use of heat-resistant steel alloy with a small chromium proportion of only 1.9 to 2.6 wt % for the combustion chamber wall tubes and the surrounding wall tubes is made possible. A high recirculation proportion of flue gas for reducing the temperatures in the combustion chamber and the disadvantages therewith described in the introduction are avoided. In this way, the forced flow steam generator can be operated very economically. For the walls, martensitic steel alloys or nickel-based materials can be dispensed with, which significantly simplifies both the construction and the maintenance of the steam generator.

In an advantageous embodiment, the wall heating surface arrangement is heated by means of the flue gases in the combustion chamber on one side only. The wall heating surface arrangement is therefore constructed and arranged on the combustion chamber wall so that no proportion—or only an insignificantly small proportion—of flue gases can penetrate in the region between the wall heating surface arrangement and the combustion chamber wall. The wall heating surface arrangement, at least on its underside which is associated with the burner arrangement, preferably butts indirectly or directly against the combustion chamber wall. In a preferred exemplary embodiment, the wall heating surface arrangement can also butt against the combustion chamber wall, preferably directly butt against the combustion chamber wall, along the entire extent of the wall heating surface arrangement in the flow direction of the flue gas.

It is advantageous if the wall heating surfaces extend in one plane in each case. In a preferred embodiment, each wall heating surface comprises a plurality of heating surface tubes which butt against each other or extend next to each other, forming small interspaces of 2 cm maximum. The heating surface tubes can have a bend point, or a plurality of bend points, and extend in the plane in which extends the wall heating surface in question. The heating surface tubes of each wall heating surface can be fluidically connected to a separate header. As a result of the flat wall heating surfaces, a good shielding of the combustion chamber wall section lying behind them is achieved and the heat absorption of the operating medium in the combustion chamber wall tubes is altogether reduced. Furthermore, flat wall heating surfaces are simple to produce and to maintain. The splitting of the wall heating surface arrangement into a plurality of separate wall heating surfaces makes handling easier during the production and during the construction of the forced flow steam generator.

In a preferred exemplary embodiment, the operating medium flows through the heating surface tubes of each wall heating surface. In particular, the operating medium flows consecutively through the combustion chamber wall tubes and then through the heating surface tubes of the wall heating surface arrangement and/or through the tubes of the at least one auxiliary heating surface. The wall heating surface arrangement can be constructed as a wall superheater or as a reheater. In a further embodiment, one part of the wall heating surfaces can form a reheater and another part of the wall heating surfaces can form a superheater.

In the oxyfuel process according to the invention, an oxygen-flue gas mixture is fed to the at least one burner or to the combustion chamber for combusting a fuel, preferably dry brown coal. The proportion of pure oxygen to the overall volume of the oxygen-flue gas mixture amounts to 18 to 40 vol % and preferably 21 to 30 vol %. Oxygen which has a proportion of at least 90 vol % of oxygen is understood here as pure oxygen.

Figure 2:
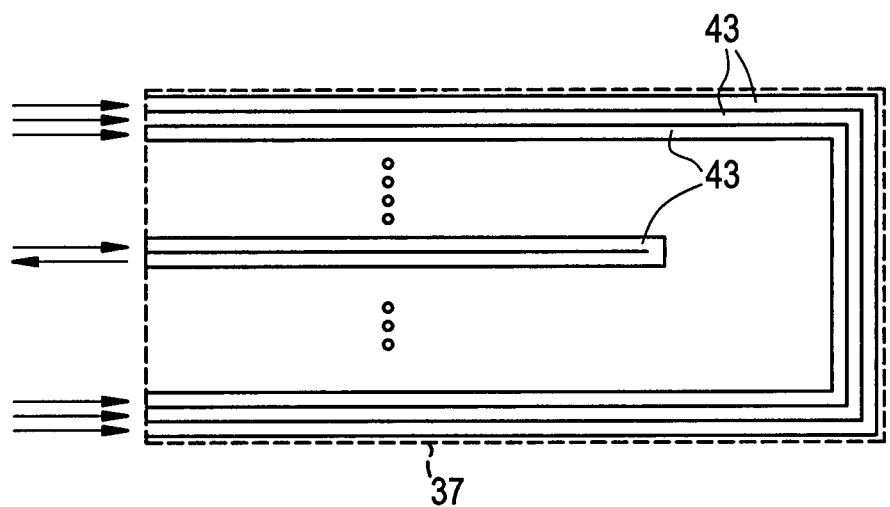
Figure 3:
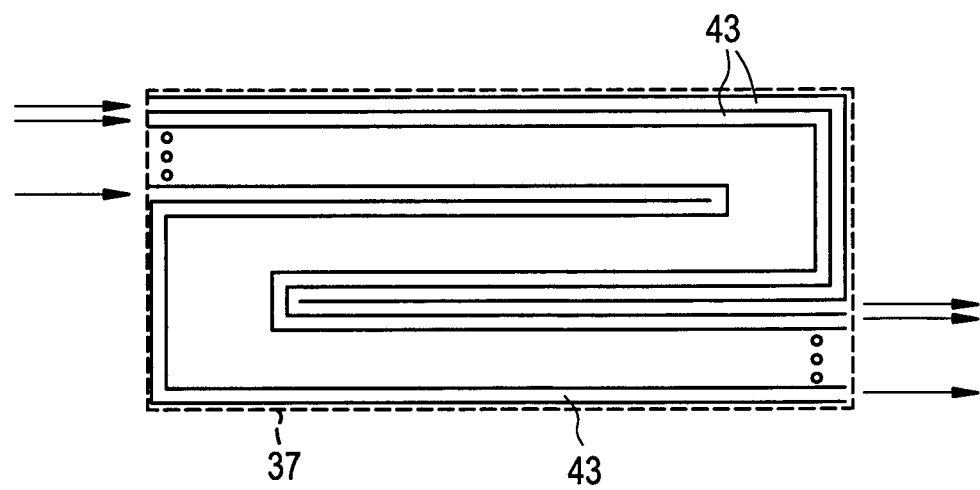
Figure 4:
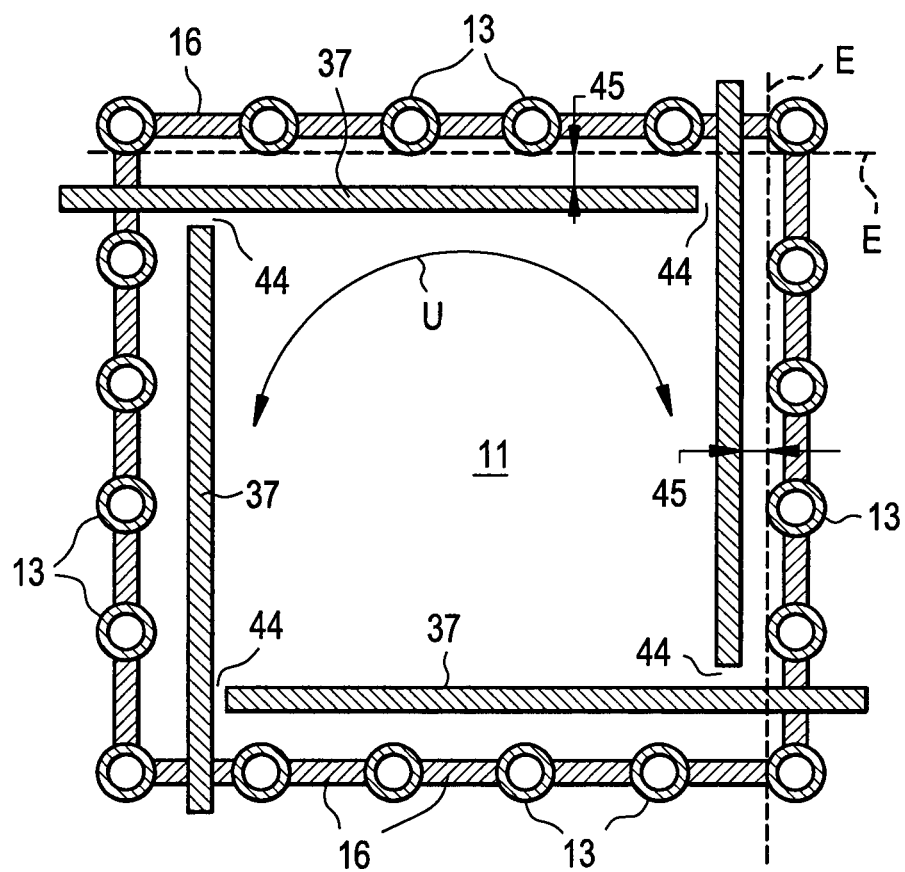

Advantageous embodiments of the forced flow steam generator and of the method for operating the forced flow steam generator are gathered from the dependent patent claims and from the description. In the description, further features of the invention are explained based on a preferred exemplary embodiment, wherein the drawing is to be consulted in addition. In the drawing:

FIG. 1 shows an exemplary embodiment of a forced flow steam generator in a schematic block diagram-like representation, FIG. 2 shows a schematic block diagram-like representation of a wall heating surface of the forced flow steam generator according to FIG. 1 with heating surface tubes extending in a U-shaped configuration, FIG. 3 shows a schematic block diagram-like representation of a further exemplary embodiment of a wall heating surface of the forced flow steam generator according to FIG. 1 with heating surface tubes extending in a Z-shaped configuration, and FIG. 4 shows a schematic representation of a cross section through the combustion chamber of the forced flow steam generator according to FIG. 1 in the region of the wall heating surface arrangement according to the line of intersection IV-IV.

A block diagram-like representation of a forced flow steam generator 10 is shown in FIG. 1. The forced flow steam generator 10 has a combustion chamber 11 which is delimited by a combustion chamber wall 12. The combustion chamber wall 12 encloses the combustion chamber 11 in a gastight manner. The combustion chamber wall has a multiplicity of combustion chamber wall tubes 13 (FIG. 4) which in each case constitute a fluid passage for an operating medium A. A flue gas duct 27 is connected to the combustion chamber 11 in the flow direction S of the flue gas R. The flue gas duct 27 is delimited by a surrounding wall 17 which has a plurality of surrounding wall tubes which are interconnected in a gastight manner. The flue gas duct 27 is connected to the combustion chamber 11 and serves for discharging the flue gas R from the forced flow steam evaporator 10. The surrounding wall tubes are fluidically connected in series to the combustion chamber wall tubes 13, and operating medium flows through said surrounding wall tubes.

Water or a water-steam mixture serves as the operating medium A. In the forced flow steam generator 10, during a single pass of the operating medium A through the evaporator, subcritical or supercritical hot steam is produced and then, for example, can be fed to a steam turbine in a power plant for power generation. The operating medium A is fed into the combustion chamber wall tubes 13 at a feed point 15.

In the preferred exemplary embodiment, the combustion chamber wall tubes 13 are interconnected via ribs 16 for creating the gastight combustion chamber wall 12. Between two adjacent combustion chamber wall tubes 13, provision is made in each case for a rib 16 which is frequently also referred to as a fin. Such a construction of the combustion chamber wall 12 is also referred to as a tube-fin connection. According to the example, the surrounding wall tubes are interconnected in the same way.

The combustion chamber wall 12 and also the surrounding wall 17, that is to say the combustion chamber wall tubes 13, the surrounding wall tubes and the ribs 16 lying in between, are produced from a steel alloy with a chromium proportion of at least 1.9 wt % and at most 2.6 wt % of chromium in the case of the preferred exemplary embodiment. It is a ferritic steel alloy in this case. The chromium proportion preferably lies within the range of 2.25 wt % to 2.5 wt %. Steel alloy T23 or T24, for example, is suitable as material. The chemical properties of this steel alloy are specified in the following table:

| Standard | Grade | C | Mn | P | S | Si | Cr | Mo | Ti | V | W |
|---|---|---|---|---|---|---|---|---|---|---|---|
| ASTM A 213 | T22 | max. 0.15 | 0.30 0.60 | max. 0.030 | max. 0.030 | 0.25 1.00 | 1.9 2.6 | 0.87 1.13 | n.s. n.s. | n.s. n.s. | n.s. n.s. |
| ASTM A 213 (Code Case 2199) | T23 | 0.04 0.10 | 0.10 0.60 | max. 0.030 | max. 0.010 | max. 0.50 | 1.9 2.6 | 0.05 0.30 | n.s. n.s. | 0.20 0.30 | 1.45 1.75 |
| ASTM A 213 (Draft) | T24 | 0.05 0.10 | 0.30 0.70 | max. 0.020 | max. 0.010 | 0.15 0.45 | 2.2 2.6 | 0.90 1.10 | 0.05 0.10 | 0.20 0.30 | n.s. n.s. |
| ASTM A 213 | T91 | 0.08 0.12 | 0.30 0.60 | max. 0.020 | max. 0.010 | 0.20 0.50 | 8.0 9.5 | 0.85 1.05 | n.s. n.s. | 0.18 0.25 | n.s. n.s. |

| Standard | Grade | Cb | B | N | Ni | Al |
|---|---|---|---|---|---|---|
| ASTM A 213 | T22 | n.s. n.s. | n.s. n.s. | n.s. n.s. | n.s. n.s. | n.s. n.s. |
| ASTM A 213 (Code Case 2199) | T23 | 0.02 0.08 | 0.0005 0.0060 | Max. 0.030 | n.s. n.s. | max. 0.030 |
| ASTM A 213 (Draft) | T24 | n.s. n.s. | 0.0015 0.0070 | Max. 0.012 | n.s. n.s. | max. 0.020 |
| ASTM A 213 | T91 | 0.06 0.10 | n.s. n.s. | 0.030 0.070 | max. 0.40 | max. 0.040 | n.s. = not specified

In the exemplary embodiment, the combustion chamber wall tubes 13 for the most part extend obliquely to the horizontal and vertical. The forced flow steam generator 10 is designed in a tower type of construction. At the bottom, the combustion chamber 11 is constructed as a combustion chamber funnel 18. At the end of the combustion chamber 11 which is associated with the combustion chamber funnel 18, provision is made for a burner arrangement 20 with a burner or a plurality of burners 21. The burners 21 create flames for combusting a fuel B, the fuel being crushed dry brown coal in the preferred exemplary embodiment.

An oxygen-flue gas mixture G is fed to the combustion chamber 11 or to the burner arrangement 20. For this purpose, at least one feed line 22 is connected to the burner arrangement 20 or to the combustion chamber 11. According to the example, the already mixed oxygen-flue gas mixture G is fed via the feed line 22. The feed line 22, via a premixer 30, is connected to an oxygen supply 23 and to a flue gas recirculation line 28. Pure oxygen O2 is stored in the oxygen supply 23. Oxygen with an O2 proportion of at least 90 vol % is to be understood as pure oxygen in this case. The premixer 30 can also be a component part of the burner arrangement 20. Alternatively, the possibility also exists of feeding the oxygen O2 and the flue gas R to the combustion chamber 11 or to the burner arrangement 20 separately in separate lines. It is also possible to provide a multistage, and preferably two-stage, mixing, wherein one part of the flue gas R which is fed back in the flue gas recirculation line 28 is fed directly into the combustion chamber 11 and the other part of the fed back flue gas R is used for premixing with the oxygen. This alternative is illustrated in FIG. 1 by a dashed line.

Connected to the flue gas duct 27 is a flue gas passage 26, to which is connected the flue gas recirculation line 28 which, as previously described, recirculates a part of the flue gas R for producing the flue gas-oxygen mixture G. Between the flue gas duct 27 and the flue gas passage 26, provision can be made for a flue gas treatment unit 25 which contains a flue gas scrubber, for example. The proportion of fed back flue gas R can be fixed or variable in its setting via an adjustment device 29. It is possible in this case that the proportion of fed back flue gas R is adapted to the current operating requirements of the forced flow steam generator 10. The proportion of fed back flue gas R is preferably fixed in its setting, however.

At least one auxiliary heating surface, and preferably a plurality of auxiliary heating surfaces 35, is, or are, located at a distance from the burner arrangement 20 in the flow direction S of the flue gas R, wherein in FIG. 1 three auxiliary heating surfaces 35 are illustrated purely by way of example. The auxiliary heating surfaces 35 can serve as so-called economizers, as superheaters or reheaters for the operating medium A. They are hydraulically connected in series to the combustion chamber wall tubes 13 to the surrounding wall tubes. The auxiliary heating surfaces 35 are arranged in the flue gas duct 27. The combustion chamber 11 is designed so that the flue gas R reaches a predetermined combustion chamber exit temperature, for example between 950 and 1100° C., at the transition point 24 to the flue gas duct 27.

Between the burner arrangement 20 and the at least one auxiliary heating surface 35, provision is made in the combustion chamber 11 for a wall heating surface arrangement 36 which in the preferred exemplary embodiment comprises a plurality of separate wall heating surfaces 37. The wall heating surface arrangement 36 at least partially covers, and, according to the example, in the main completely covers, a combustion chamber-section 38 in the circumferential direction U. The wall heating surface arrangement 36 has a height H in the flow direction S of the flue gas R. The area, and especially the height H, can be selected so that the wall heating surface arrangement 36 sufficiently absorbs heat from the flue gas R and prevents an excessively intense heating of the operating medium A which flows through the combustion chamber wall tubes 13. The wall heating surface arrangement 36 can be directly connected by its underside 39 to the burner arrangement 20. In this case, the vertically uppermost burner 21 of the burner arrangement 20 is deemed to be a reference point if the burners 21 of the burner arrangement 20 are arranged at different heights in the flow direction S. Alternatively or additionally, the wall heating surface arrangement 36, by its upper side 40 lying opposite in the flow direction S, can be connected directly to the first, or lowermost, auxiliary heating surface 35, as seen in the flow direction S. The wall heating surface arrangement 36 is preferably arranged so that its underside 39 is arranged at a distance from the burner arrangement 20.

The number of wall heating surfaces 37 of the wall heating surface arrangement 36 can vary. In the exemplary embodiment, which is shown only schematically here, four individual wall heating surfaces 37 are provided, as is illustrated in FIG. 4. The wall heating surfaces 37 extend in each case in a plane which, according to the example, extends vertically. Therefore, the wall heating surfaces 37 in the exemplary embodiment are arranged parallel to a respectively associated wall segment of the combustion chamber wall 12 which is covered by the wall heating surface 37 in question. In FIG. 4, the combustion chamber wall 12 is quadratically represented, as seen in cross section. As a variation to this, other cross-sectional shapes, for example a rectangular cross section or another polygonal cross section can also be realized.

Each wall heating surface 37 has a multiplicity of individual heating surface tubes 43. The heating surface tubes 43 are arranged in contact with each other, or closely next to each other, so that they form a flat wall heating surface 37, as is shown schematically for two exemplary embodiments in FIGS. 2 and 3. In the exemplary embodiment according to FIG. 2, the lengths of the heating surface tubes 43 of a wall heating surface 37 are different. Each heating surface tube 43, in this exemplary embodiment, has two basically parallel extending sections which are interconnected at one end via a transverse section so that a U-shaped configuration of the heating surface tube is created. These arched heating surface tubes are arranged one inside the other so that a basically closed surface is created overall.

In a further exemplary embodiment of the wall heating surface 37 according to FIG. 3, the individual heating surface tubes 43 are all approximately of the same length. In the depicted example, they have a Z-shaped course with three sections which extend basically parallel to each other. The centre parallel section is connected at its two ends to one of the two outer parallel sections in each case. A plurality of heating surface tubes 43, which are bent in a Z-shaped configuration, are located one inside the other in one plane so that overall a basically closed surface is created for the wall heating surface 37, as is schematically shown in FIG. 3.

The heating surface tubes 43 of a wall heating surface 37 either butt against each other with contact or lie adjacent to each other, forming small interspaces or gaps of 2 cm maximum. As a result, it is ensured that no hot flue gas, or only a small amount of hot flue gas, can find its way through the wall heating surface 37 to the covered combustion chamber wall section 38.

The heating surface tubes 43 of a wall heating surface 37 are not fixedly interconnected according to the example, but only abut along their course. The connection of the heating surface tubes 43 of a wall heating surface 37 is effected exclusively in the region of the connecting point to the combustion chamber wall 12. Alternatively, the wall heating surfaces 37 could also be designed as a tube-fin connection and form a gastight surface.

A plurality of such flat wall heating surfaces 37 form the wall heating surface arrangement 36. The wall heating surfaces 37 in the preferred exemplary embodiment either butt against each other in the circumferential direction U or form small interspaces of 30 cm maximum and preferably of 10 cm maximum. Shown in the preferred exemplary embodiment according to FIG. 4 are four flat wall heating surfaces 37 which lie closely adjacent to each other, forming small interspaces 44. The individual wall heating surfaces 37 are preferably not mechanically interconnected but if necessary butt against each other. A welded connection or another fixed connection between the wall heating surfaces 37 of the wall heating surface arrangement 36 does not exist. The wall heating surfaces 37 are only fixedly connected to the combustion chamber wall 12.

The wall heating surfaces 37 can be arranged inside the combustion chamber wall section 38 in an offset manner to each other in the flow direction. The wall heating surfaces 37 preferably cover each of the combustion chamber wall tubes 13 in the combustion chamber wall section 38 along a predetermined length. Alternatively to this, it can also be possible, however, to not cover all the combustion chamber wall tubes 13 in the combustion chamber wall section 38, which, however, necessitates additional measures in order to prevent the critical operating medium temperature being exceeded in these combustion chamber wall tubes 13 which are not covered by the wall heating surfaces 37.

Operating medium also flows through the heating surface tubes. The feed of operating medium can be carried out above or below the extraction of the operating medium. In other words, there is flow through a wall heating surface 37 against the flow direction S of the flue gas R or in the flow direction S of the flue gas. The throughflow which is shown in FIGS. 2 and 3 can therefore also take place in the opposite direction.

The wall heating surface arrangement 36 and, according to the example, all the wall heating surfaces 37, consist of martensitic steels, austenitic steels or nickel-based alloys. In particular, the martensitic steels have a chromium proportion of 9-12 wt %, the austenitic steels have a chromium proportion of up to 25 wt %, and the nickel-based alloys have a chromium proportion of 20-30 wt %. For example, the martensitic materials T91 (X1 0CrMoVNb9-1), T92 (X10CrWMoVNb9-2) or VM12-SHC, austenitic steel alloys SUPER 304H, HR3C, DMV304HCu, DMV3101N or nickel-based alloys such as Alloy 617 (NiCr23Co12Mo) or Alloy 617 mod (NiCr23Co12Mo mod) can be used. Such materials are suitable for high medium temperatures. The combustion chamber wall section 38 which is at least partially covered by the wall heating surface arrangement 36 is effectively shielded in order to avoid a temperature rise of the operating medium A in the combustion chamber wall tubes 13 above a critical temperature, for example above about 500° C.

In the preferred exemplary embodiment, the wall heating surfaces 37 butt directly against the combustion chamber wall tubes 13 along their entire height H in the flow direction S. The wall heating surfaces 37, however, at least butt against the combustion chamber wall tubes 13 by their underside 39. As a result, it is guaranteed that only small interspaces or gaps 45 of 1 cm or less remain between the wall heating surfaces 37 of the wall heating surface arrangement 36 and the combustion chamber wall section 38 at least on the underside 39 so that at best only a small amount of hot flue gas R can penetrate into the region between the wall heating surface arrangement 36 and the combustion chamber wall 12. This gap 45 is measured at right angles to a plane E which extends tangentially to the combustion chamber wall tubes 13. The wall heating surface arrangement 36 is therefore in contact with the hot flue gas R only from one side and heated from only one side. The other side, which faces the combustion chamber wall section 38, is unheated. The combustion chamber wall section 38 is therefore at least partially shielded against heat absorption by the wall heating surface arrangement 36.

The combustion chamber wall tubes 13 extend vertically at least in the region of the combustion chamber wall section 38. Beneath the combustion chamber wall section 38 and especially in the region of the burner arrangement 20, the combustion chamber wall tubes 13 extend obliquely to the vertical and to the horizontal.

The height H of the wall heating surface arrangement 36 or its heated surface is selected so that a predetermined thermal energy absorption is carried out over the wall heating surface arrangement 36. In this way, the temperature of the flue gas is reduced while flowing in the flow direction S. The energy absorption of the operating medium A in the combustion chamber wall tubes 13 and also in the surrounding wall tubes is consequently limited. It is guaranteed that a critical temperature at a predetermined operating pressure of the operating medium A in the combustion chamber wall tubes 13 and surrounding wall tubes is not exceeded. For the combustion chamber wall 12 and the surrounding wall 17, therefore, use is made of a steel alloy with a low chromium proportion, which can be simply worked, especially welded.

During operation of the forced flow steam generator 10, finely crushed dry brown coal, with a particle size of preferably less than 1 mm, is fed as fuel B to the combustion chamber 11. Also, the oxygen-flue gas mixture G is fed as oxidant via the feed line 22 to the burner arrangement 20 and/or to the combustion chamber 11. For this purpose, a proportion of the flue gas R is extracted from the flue gas passage 26 and fed back for recirculation via a flue gas recirculation line 28. The operating medium A, which is formed by water or by a water-steam mixture, is fed into the combustion chamber wall tubes 13 and heated there. Subsequent to the combustion chamber wall tubes 13, the operating medium A also passes through an auxiliary heating surface, or through a plurality of auxiliary heating surfaces 35, and also through the heating surface tubes 43 of the wall heating surfaces 37 of the wall heating surface arrangement 36. The operating medium A is evaporated and superheated in the process. The water-steam is then fed to a steam turbine, for example, for power generation. The evaporation of the operating medium A takes place in the forced flow steam generator 10 during a single pass through the evaporator.

During operation of the forced flow steam generator 10, the gaps or interspaces 44, 45 between the wall heating surfaces 37 and the combustion chamber wall section 38 and also between the heating surface tubes 43 are clogged with ash particles. This is achieved by the size of the interspaces 45 being fixed at 1 cm maximum and the size of the interspaces 44 being fixed at 2 cm maximum. The clogging of these interspaces 44, 45 is utilized in order to seal, so to speak, the region between the wall heating surface arrangement 36 and the combustion chamber wall section 38 and to prevent or to reduce contact of this combustion chamber wall section 38 with the hot flue gas so that the absorption of thermal energy in the region of the combustion chamber wall section 38 is at least significantly reduced.

Instead of air, according to the invention pure O2 is used. In order to control the combustion temperatures in the combustion chamber 11, the oxygen-flue gas mixture G is produced by means of recirculated flue gas R and combusted together with the fuel B in the combustion chamber 11. This process is also referred to as the oxyfuel process. By covering the combustion chamber wall section 38, higher temperatures in the combustion chamber 11 can be permitted without having to fear a critical temperature of the operating medium being exceeded. The proportion of recirculated flue gas R and also the consumption of oxygen can be kept to a minimum.

The invention refers to a forced flow steam generator 10 and to a method for its operation. The forced flow steam generator 10 has a combustion chamber 11 with a burner arrangement 20. A fuel B and a mixture G consisting of pure oxygen and flue gas R are fed into the combustion chamber 11 or to the burner arrangement 20 for combustion. A flue gas duct 27, which is delimited by a surrounding wall 17, is connected to the combustion chamber 11 in the flow direction S of the flue gas R, and a flue gas passage 26 is connected to the flue gas duct. The flue gas R for the oxygen-flue gas mixture G is fed back from the flue gas passage 26 via a flue gas recirculation line 28. The forced flow steam generator 10 is therefore operated in the so-called oxyfuel process. A plurality of auxiliary heating surfaces 35 are arranged in the flue gas duct 27. Between the burner arrangement 20 and the auxiliary heating surfaces 35, provision is made in the combustion chamber 11 for a wall heating surface arrangement 36 which at least partially covers a combustion chamber wall section 38 of the combustion chamber wall 12 which delimits the combustion chamber 11. For this purpose, the wall heating surface arrangement 36 has a plurality of wall heating surfaces 37 which butt against the respectively associated segment of the combustion chamber wall section 38. Operating medium A flows through the wall heating surface arrangement 36 and in this way thermal energy is dissipated from the flue gas R in order to limit the heating of the operating medium A in the wall tubes of the combustion chamber 11 and also in the flue gas duct 27 and therefore to limit wall tube temperatures in the upper section of the boiler.

The invention claimed is:

1. A forced flow steam generator comprising
   a combustion chamber delimited by a gastight combustion chamber wall, wherein the combustion chamber wall has a plurality of interconnected combustion chamber wall tubes, through which flows an operating medium, and which consist of a heat-resistant steel alloy with a chromium proportion of 1.9 to 2.6 wt %,
   a flue gas duct connected to the combustion chamber in the flow direction of the flue gas and is delimited by a surrounding wall with a plurality of surrounding wall tubes through which flows the operating medium and which consist of a heat-resistant steel alloy with a chromium proportion of 1.9 to 2.6 wt %,
   a burner arrangement which has at least one burner and is arranged in the combustion chamber,
   at least one auxiliary heating surface through which flows the operating medium and which is arranged in the flue gas duct,
   at least one feed line connected to the burner arrangement or to the combustion chamber, wherein oxygen and flue gas are fed separately or together via the at least one feed line in order to obtain an oxygen-flue gas mixture, and
   a wall heating surface arrangement through which flows the operating medium and which is arranged in the combustion chamber between the burner arrangement and the at least one auxiliary heating surface in the flow direction of the flue gas, and at least partially covers a combustion chamber wall section,
   wherein the wall heating surface arrangement includes an underside associated with the burner arrangement, wherein the underside butts against the combustion chamber wall.

2. The forced flow steam generator according to claim 1, wherein the wall heating surface arrangement partially covers, or in the main completely covers, the combustion chamber wall section in the circumferential direction.

3. The forced flow steam generator according to claim 1, wherein the at least one feed line is fluidically connected to an oxygen supply.

4. The forced flow steam generator according to claim 1, wherein the at least one feed line is fluidically connected to a flue gas recirculation line.

5. The forced flow steam generator according to claim 1, wherein in the case of the steel alloy of the combustion chamber wall tubes or of the surrounding wall tubes it is a ferritic steel alloy and is especially steel alloy T23 or T24.

6. The forced flow steam generator according to claim 1, wherein the wall heating surface arrangement is heated by the flue gas in the combustion chamber on one side only.

7. The forced flow steam generator according to claim 1, wherein the wall heating surface arrangement has a plurality of wall heating surfaces which butt against each other in the circumferential direction of the combustion chamber and extend in one plane in each case.

8. The forced flow steam generator according to claim 7, wherein the heating surfaces comprises a plurality of heating surface tubes which butt against each other or extend next to each other at a distance of 2 cm maximum, forming small interspaces.

9. The forced flow steam generator according to claim 7, wherein the wall heating surfaces, which are connected to each other in the circumferential direction, butt against each other or lie adjacent to each other at a distance of 30 cm maximum, forming small interspaces.

10. The forced flow steam generator according to claim 1, wherein the wall heating surface arrangement consists of a martensitic steel alloy with a chromium proportion of 9 to 12 wt % or austenitic steel alloy with a chromium proportion of up to 25 wt or a nickel-based alloy with a chromium proportion of 20 to 30 wt %.

11. The forced flow steam generator according to claim 1, wherein the wall heating surface arrangement butts against the combustion chamber wall over its entire height in the flow direction of the flue gas.

12. The forced flow steam generator according to claim 1, wherein the oxygen has a proportion of 18 to 40 vol % and preferably 21 to 30 vol % of the overall volume of the oxygen-flue gas mixture which is fed to the combustion chamber and/or or to the burner arrangement.

13. A method for operating a forced flow steam generator, which has a combustion chamber, with a burner arrangement which is delimited by a gastight combustion chamber wall, wherein the combustion chamber wall has a plurality of interconnected combustion chamber wall tubes which consist of a heat-resistant steel alloy with a chromium proportion of 1.9 to 2.6 wt %,
   which has a flue gas duct, which is connected to the combustion chamber in the flow direction of the flue gas and is delimited by a surrounding wall with a plurality of surrounding wall tubes through which flows the operating medium and which consist of a heat-resistant steel alloy with a chromium proportion of 1.9 to 2.6 wt %,
   which has at least one auxiliary heating surface which is arranged in the flue gas duct,
   and which has a wall heating surface arrangement which is arranged between the burner arrangement and the least one auxiliary heating surface in the flow direction of the flue gas and at least partially covers a combustion chamber wall section, the wall heating surface arrangement includes an underside associated with the burner arrangement, and the underside butts against the combustion chamber wall, the method comprising:
   passing a flow of operating medium through the combustion chamber wall tubes, the surrounding wall tubes, the auxiliary heating surface and the wall heating surface arrangement, and
   feeding oxygen and flue gas to the burner arrangement or into the combustion chamber and combusting a fuel, wherein the oxygen-flue gas mixture serves as oxidant.

* * * * *